Dec. 7, 1965    W. H. BACON    3,221,850
CLUTCH MECHANISM
Filed Jan. 23, 1964
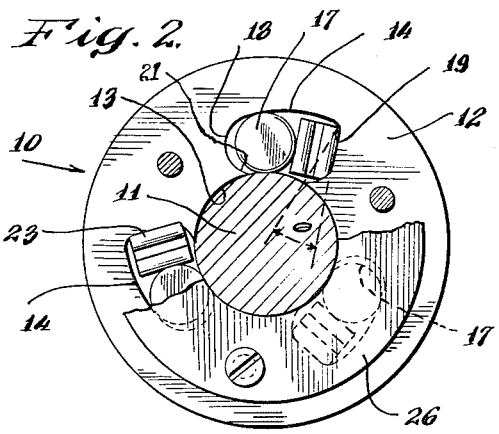
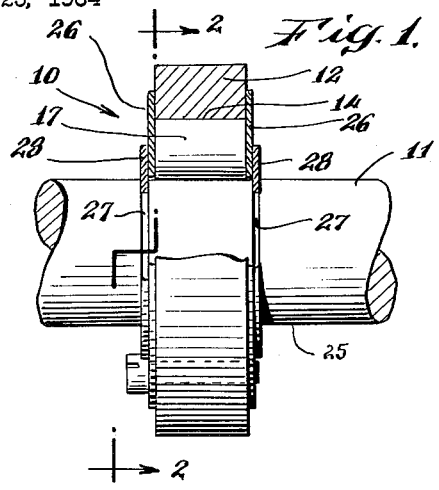
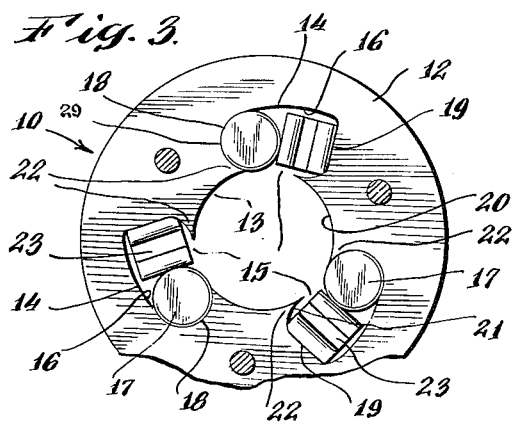
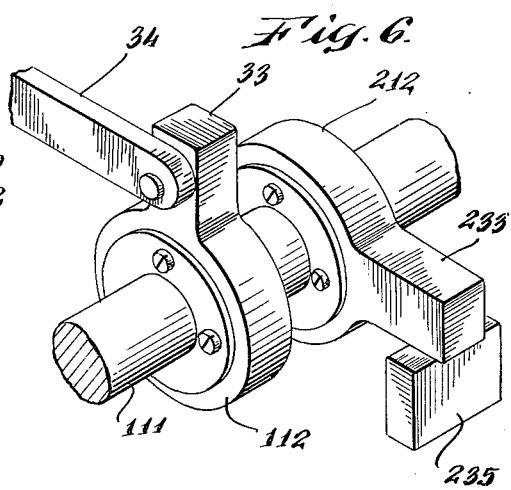
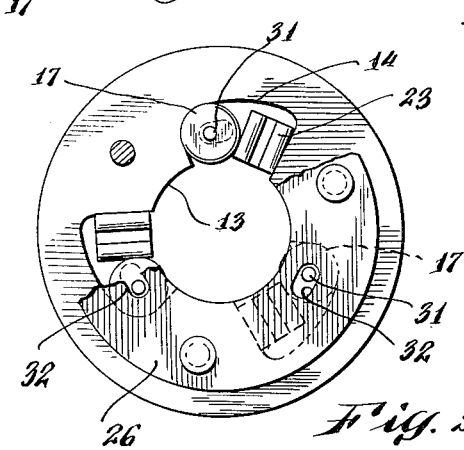
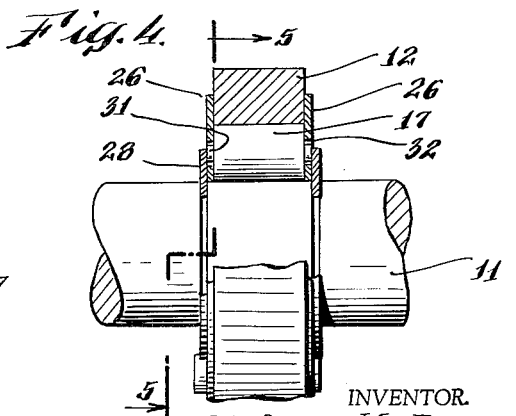
INVENTOR.
Walter H. Bacon
BY
Roy L. Parsell
ATTORNEY United States Patent Office 3,221,850
Patented Dec. 7, 1965

1

3,221,850
CLUTCH MECHANISM
Walter H. Bacon, 39 Dogwood Road, North Haven, Conn.
Filed Jan. 23, 1964, Ser. No. 339,621
3 Claims. (Cl. 192—45)

This invention relates to a clutch mechanism and in particular to a novel mechanism of the one way over running type which is removably mounted on a shaft with which it may have driving engagement.

In general, over running clutches for coupling two working parts into driving engagement include essentially a rotatable outer race and a rotatable inner race connected respectively to the driving part and the driven part or vice versa of an apparatus. Rollers or balls are located in sections of one of the races which sections are not concentric with the other race so that the rollers or balls act as wedges to lock the two races together depending on the direction of rotations and to which race the driving force is applied. In such clutches the two races are in turn connected externally to their respective working parts of the apparatus by various means such as sleeves, bushings or hubs. Usually one of the parts of the apparatus presents a shaft to be connected through a sleeve or a hub to one of the races.

It is the primary object of my invention to provide a clutch mechanism which eliminates the intermediate connecting means such as the sleeve or hub.

Another object is to provide a clutch mechanism in which a shaft of the apparatus acts as a race.

Yet another object of my invention is to provide a race member assembly acting as either a driving or driven part which comprises a unitary assembly of a race member together with wedging element permitting separation of the two parts.

Another object of my invention is to provide a clutch which requires very little space for a given strength or power demand.

Still another object of my invention is to provide a unitary clutch assembly which can be easily attached to a shaft at any desired axial point along the shaft.

Yet another object is to provide a clutch of relatively few parts.

A further object of my invention is to provide latch means to permit quick separating of the clutching mechanism.

A still further object is to provide a race member assembly acting as either a driving or a driven part clutching a shaft which is the companion driven or driving part.

Other objects and a fuller understanding of the invention may be had by referring to the following descriptions and claims, taken in consideration with the accompanying drawings, in which:

FIGURE 1 is an elevation view of the assembled mechanisem incorporating the invention;

FIGURE 2 is a sectional view on the line 2—2 of FIGURE 1;

FIGURE 3 is a view corresponding to FIGURE 2 with the shaft member removed;

FIGURE 4 is an elevation view of another embodiment of the invention;

FIGURE 5 is a sectional view on line 5—5 of FIGURE 4;

FIGURE 6 is a perspective view of still another embodiment of the invention;

FIGURE 7 is a view of a wedging roller.

Referring now to the drawings the numeral 10 designates generally the assembled mechanism in which a shaft 11 is journaled in a cylindrical race housing 12 in a central opening 13 thereof.

Radially situated from central opening 13 are recesses 14 each connected to the central opening 13 by a restricted

2 connecting opening 15. The outer surface of the recess 14 due to the thickness of the housing 12 presents a substantial area to act as an outer race 16 to engage a wedging roller 17 as will be described in more detail later.

One end 18 of each recess 14 is nearer to the periphery 20 of central opening 13 than is the other end 19 so that the outer surface or race 16 in effect converges toward the periphery 20 from recess end 19 to recess end 18. In the preferred embodiment this outer surface or race 16 is arcuate while end 18 is curvilinear and end 19 is planar. Furthermore, end 19 is inclined at an angle θ measured between the inclined surface of end 19 and a radial line extending through the point of intersection of the outer side of the recess 14 and the end 19.

The inner surfaces 21 of the recess 14 (FIGURES 2 and 3) respectively merge with the periphery 20 to form lips 22 which restrict the connecting opening 15 and act to retain a wedging roller 71 in the recess 14 under the bias of a spring 23 when the shaft 11 is removed (FIG. 3) from the housing 12. The spring 23 is preferably of flat stock of a width corresponding to the thickness of the housing 12 and is bent into corrugations which when mounted in recess 14 has one end thereof abutting the recess end 19 and the other end engaging roller 17 to bias roller 17 toward the opposite end 18 of recess 14. In my preferred embodiment I use rollers as wedging members but other means may be used such as balls. Some of the races may be formed with appropriate contours if necessary.

When shaft 11 journalled in place in central opening 13, (FIG. 2) roller 17 will engage the outer race 16 and through connecting opening 15 engage the outer surface 25 of shaft 11 which also acts as inner or companion race for roller 17.

When shaft 11 is removed from the opening 13 the spring 23 will urge roller 17 between lip 22 and outer race 16 thereby retaining roller 17 in recess 14.

A disc plate 26 mounted on each side of housing 12 secures each roller 17 against axial displacement and further acts to retain both roller 17 and spring 23 in each respective recess 14.

In the preferred form annular grooves 27 are provided in the exterior surface of shaft 11 adjacent the disc plates 26 to receive a spring ring 28 to retain housing 12 against axial movement. However, other means such as a shoulder on shaft 11 or a pin protruding from the surface of the shaft 11 may be equally desirable.

In operation when a counter clockwise force, as viewed in FIGURE 2, is applied to shaft 11 there will be a tendency to wedge roller 17 between the two races 16 and 25 and effect driving engagement between shaft 11 and housing 12 which will continue as long as the driving force is maintained. On the other hand, when the same directional (counter clockwise) driving force is applied to the housing there will be no wedging action by roller 17 and hence no driving engagement.

However, when a clockwise, as viewed in FIGURE 2, driving force is applied to the housing 12 wedging will take place and driving engagement will continue as long as the driving force is maintained.

When it is desired to separate the shaft 11 from the housing 12, the spring ring 28 is removed and the shaft 11 withdrawn. The roller 17 is forced by spring 23 into the pocket 29 between lip 22 and outer race 16 and is retained in recess 14. The slope of the inclined end 19 relative to the slope of the curvilinear end 18 at the area of engagement with the roller 17 is such that the resultant force exerted by the spring 23 on the roller will retain the roller in the recess when the shaft is not journaled in the housing. For reassembling shaft 11 to housing 12, it is preferable to form a bevel on the ends of roller 17 in order that the roller 17 may be easily pushed back through connecting opening 15 sufficiently to enable shaft 11 to completely enter the central opening 13. An alternate method would be to form a bevel on the entering end of shaft 11.

In another embodiment as shown in FIGURES 4 and 5 each roller 17 is provided with axle pins 31 which ride in enlarged slots 32 in the disc plates 26 to retain the roller 17 in the recess 14 when the shaft 11 is removed yet permit roller 17 to float in recess 14 for engagement with races 16 and 25.

In still another embodiment of my clutch is its adaption to an anti backlash ratchet mechanism as shown in FIGURE 6. In this embodiment a first housing 112 similar to housing 12 is mounted on a common shaft 111 and provided with an arm 33 and a link 34 so that housing 112 may be rocked back and forth. A second housing 212 is mounted on shaft 111 but in opposite driving engagement relative to shaft 111 than housing 112. Second housing 212 also has an arm 233 which arm however is anchored by any suitable means such as a post 235 against rotation in any direction.

To describe this operation assume that first housing 112 when acted on by a clockwise, as viewed in FIGURE 6, driving force is in driving engagement with shaft 111 and that second housing 212 is in driving engagement with shaft 111 when a clockwise driving force is applied to housing 212 which is the same as if a counter clockwise driving force is applied to the shaft 111.

By means of the reciprocating link 34 and arm 33 a driving force is applied to move the first housing 112 clockwise for the portion of the revolution corresponding to the stroke of link 34. Being in driving engagement with shaft 111 this shaft is given angular rotation corresponding to the stroke as there is no driving engagement between shaft 111 and second housing 212 to restrain its rotation in this direction. When link 34 is on the return stroke, that is, to rotate first housing 112 counter clockwise, there is no driving engagement between housing 112 and shaft 111. However, shaft 111 is prevented from any counter clockwise movement due to the driving engagement between shaft 111 and second housing 212 which exists due to the relative positions of races 16 and 25 to roller 17 and the fact that housing 212 is anchored against rotation in either direction. Thus the immediate locking of shaft 111 against movement on the return stroke of link 34 eliminates any backlash which might otherwise arise on this return stroke.

Although I have described my invention with a certain degree of particularity, it is understood that the present disclosure has been made only by way of example and that numerous changes in the details of construction and the combination and arrangement of parts may be resorted to without departing from the spirit and scope of the invention as hereinafter claimed.

What is claimed is:

1. In an over running clutch mechanism for coupling two separable working parts when a driving force is applied to one of those parts one of which comprises a shaft member, a race housing having a central opening to receive such shaft member in journal relationship, said housing having a recess adjacent to the periphery of said central opening, said recess having a first end and a second end spaced circumferentially from each other, said first end being radially closer to said central opening than said second end so that the outer side of said recess between said ends and facing said central opening constitutes a race with decreasing radial distance to the periphery of said central opening from said second to said first end, the first end having a curvilinear surface and said second end having a planar surface, the second end being inclined at an angle to a radial line extending through the point of intersection of the outer side of said recess and said second end, the inner side of said recess merging with the periphery of said central opening between said ends to form a connecting opening between said recess and said central opening, a wedging roller in said recess engaging said race and having a portion of said wedging roller extending into said connecting opening, a resilient member in said recess having one end abutting said second end and the other end engaging said wedging roller to bias said wedging roller toward said first end and into engagement with said race and said shaft member when the shaft member is journaled in said central opening to permit driving engagement between said race and said shaft member, said resilient member having a plane surface at each end thereof in abutting engagement with said roller and said second end respectively, the inclined planar surface of the second end having a slope relative to the slope of the first end at the area of engagement with said roller such that the resultant force exerted by said resilient member on said roller will retain the roller in said recess when the shaft is not journaled in the housing.

2. In the device of claim 1 said resilient member comprising a spring having wave like formation of an amplitude substantially corresponding to the axial width of said housing and having plane abutting areas.

3. In the device of claim 1 disc plate members concentrically positioned respectively on each side of and engaging said housing closing said recess and means for retaining said disc members against axial displacement when said shaft member is journaled in said housing.

References Cited by the Examiner
UNITED STATES PATENTS

| | | | |
|---|---|---|---|
| 300,503 | 6/1884 | Roscoe | 192—45 |
| 2,360,075 | 10/1944 | Schoij | 192—12 |
| 2,633,951 | 4/1953 | Ayer et al. | 192—45 |
| 2,965,204 | 12/1960 | Howard | 192—45 |
| 3,012,645 | 12/1961 | Gensheimer et al. | 192—45 |
| 3,054,489 | 9/1962 | Fahlberg | 192—45 |

DAVID J. WILLIAMOWSKY, *Primary Examiner,*